United States Patent [19]

Negishi

[11] Patent Number: 4,813,765
[45] Date of Patent: Mar. 21, 1989

[54] DEVICE FOR CHANGING DIRECTIONS OF LIGHT RAYS

[76] Inventor: Masataka Negishi, 29-19, Daito 2-Chome, Urawa-Shi, Saitama-Ken, Japan

[21] Appl. No.: 59,878
[22] PCT Filed: Sep. 19, 1986
[86] PCT No.: PCT/JP86/00489
§ 371 Date: May 18, 1987
§ 102(e) Date: May 18, 1987
[87] PCT Pub. No.: WO87/01816
PCT Pub. Date: Mar. 26, 1987

[30] Foreign Application Priority Data

Sep. 20, 1985 [JP] Japan .................. 60-209725

[51] Int. Cl.[4] .......................... G02B 5/04; G02B 6/00
[52] U.S. Cl. ............................... 350/286; 350/320; 350/96.10
[58] Field of Search ............... 350/286, 287, 162, 259, 350/260, 264, 265, 167, 127, 128, 96.10, 96.24, 173, 171, 169, 320; 126/439, 441; 362/31, 32

[56] References Cited

U.S. PATENT DOCUMENTS

| | | | |
|---|---|---|---|
| 2,646,637 | 7/1953 | Nierenberg et al. | 350/287 |
| 3,246,133 | 4/1966 | Hensleigh | 350/286 |
| 3,535,016 | 10/1970 | Malifaud | 350/96.24 |
| 3,603,670 | 9/1971 | Kim | 350/260 |
| 3,603,723 | 9/1971 | Tan | 350/96.24 |
| 3,613,532 | 10/1971 | Wildhaber | 350/96.10 |
| 3,729,626 | 4/1973 | Thurlow et al. | 362/31 |
| 3,963,327 | 6/1976 | Poiver | 350/96.10 |
| 4,627,690 | 12/1986 | Fantone | 350/286 |

FOREIGN PATENT DOCUMENTS

| | | | |
|---|---|---|---|
| 56843 | 8/1982 | European Pat. Off. | 350/96.10 |
| 2722470 | 11/1978 | Fed. Rep. of Germany | 362/31 |
| 3208162 | 10/1982 | Fed. Rep. of Germany | 362/31 |
| 1091225 | 4/1955 | France | 362/31 |
| 1363539 | 5/1964 | France | 350/96.10 |
| 84455 | 8/1974 | Japan . | |
| 127925 | 10/1978 | Japan . | |

Primary Examiner—Jon W. Henry
Attorney, Agent, or Firm—Ladas & Parry

[57] ABSTRACT

When light rays ($L_1$, $L_2$) from any arbitrary directions arrive at the surface of incidence (3) at one end of a main body (2) made of a transparent glass or plastic, they are successively totally reflected internally by opposite reflecting surfaces (5a, 5b) of the main body (2) such that an angle formed between each light ray and the perpendicular to the reflecting surface gradually approaches to a critical angle $\delta_0$ and the light rays are taken out of the main body through light emerging surfaces (5a, 5b, 4). The light rays taken out of the main body (2) through the light emerging surfaces are given greater components in directions parallel to the longitudinal direction of the main body (2) than the incident light rays ($L_1$, $L_2$). Therefore, light rays from all directions, incident to the surface of incidence (3), after being caused to pass through the main body (2), are given substantially equal directivities. Typically, the main body (2) is in the form of a wedge-shaped plate, a cone or a polyhedron. In practical use, a plurality of main bodies (2) are arranged in a parallel array to form a board-like assembly whose one surface is used as a light incidence surface.

3 Claims, 8 Drawing Sheets

DEVICE FOR CHANGING DIRECTIONS OF LIGHT RAYS

TECHNICAL FIELD

The present invention relates to a device for changing the directions of light rays and, more particularly, to a device for receiving light rays from all directions and converting them into light rays within a predetermined range of direction.

BACKGROUND ART

In the case of utilization of light, such as sunlight, whose angle of incidence gradually changes, in order to attain an effective utilization, a light source tracking device which is so controlled as to point to the direction of incident light is needed.

When a light input or reception means is always maintained to point to the direction of incidence of light by the light source tracking device, the incident light can be received in a most effective manner. However, as the angle of incidence of, for example, sunlight gradually changes according to the season of the year and from the sunrise to the sunset, an effective light source tracking device must necessarily be complicated in construction and expensive and cannot be used practically.

The present invention has been made to overcome the above and other problems encountered in the prior art and has for its object to provide a device for changing the directions of light rays, which is maintained stationary in the case of receiving light rays whose angles of incidence varies from time to time or light rays from any directions without the use of a light source tracking device and which can convert them into light rays within a predetermined direction range so as to facilitate the utilization of the received light rays.

DISCLOSURE OF THE INVENTION

A device for changing the directions of light rays in accordance with the present invention has a three-dimensional body which is made of an optically transparent material and has a light incidence surface and a light emerging surface. The main body has reflecting surfaces for causing repetitive reflections of the light rays which have entered the body through the light incidence surface. The reflecting surfaces of the main body are so arranged and shaped that the direction of a light ray which is repeatedly internally reflected within the body is caused to have an angle incident on the reflecting surfaces, which gradually approaches a critical angle with respect to the reflecting surface. A portion of the main body or a portion adjacent to said first-mentioned portion at which the light rays are reflected at the critical angle or at an angle smaller than the critical angle constitutes the light emerging surface from which the light rays whose directions are changed are derived.

The light rays which has entered through the incidence surface of the main body into the same are repeatedly internally reflected and, because of the profiles of the reflecting surfaces, the angle of each reflected light ray relative to a perpendicular is gradually increased and becomes equal to the critical angle or an angle slightly smaller than the critical angle. When reaching such condition, the light rays are not reflected internally by the reflecting surface any longer, but refracted at the reflecting surfaces, thus being emitted out of the main body. Since the light rays are incident to the reflecting surfaces at angles close to the critical angle, they are refracted at the reflecting surfaces, being emitted from the main body substantially at a predetermined angle relative to the reflecting surfaces or the outer surface of the main body or being emitted within a predetermined angular range. As a result, the light rays emitted or emerging from the main body are almost in the same direction.

BRIEF DESCRIPTION OF THE DRAWINGS

FIG. 1 is a sectional view of a main body according to a preferred embodiment of the present invention;

FIG. 2 is a perspective view thereof;

FIG. 3 is a view explanatory of the mode of operation of the first embodiment shown in FIG. 1;

BEST MODES FOR CARRYING OUT THE INVENTION

The preferred embodiments of the present invention will now be described. The device for changing the directions of light rays shown in FIG. 1 has a main body 2 made of an optically transparent material such as a transparent glass, a transparent plastics or the like. The main body 2 is, for instance, in the form of a plate of wedge-shaped cross section as shown in FIG. 2 and is gradually decreased in thickness from one side to the opposite side. An end surface 3 on one side of the main body 2 defines a light incidence surface, and a pair of opposing planes 5a and 5b which are extended from the light incidence surface 3 to an end surface 4 on the other side of the main body 2 define reflecting surfaces on which light rays which have entered the main body 2 through its light incidence surface 3 are reflected. The end surface 4 may be made very small in area or eliminated.

When a light ray $L_1$ is sent to the light incidence surface 3 of the main body 2 in the above-described construction shown in FIG. 1, it repeats internal reflections at points a, b, c, d and e on the reflecting surfaces 5a and 5b while propagating toward the end surface 4 and is finally emitted out of the main body 2 at a point f. In like manner, a light ray $L_2$ incident from a direction different from the direction of incidence of the light ray $L_1$ is repeatedly reflected internally at a1, b1, c1, d1 and e1 and is finally emitted out of the main body 2 at a point f1. These internal reflections of the light rays $L_1$ and $L_2$ are total reflection.

Next the above-described phenomenon will be considered with reference to FIG. 3. It is assumed that the angle between each of the reflecting surfaces 5a and 5b and the center surface (optical axis) O-O of the main body be $\alpha$ and that an internally reflected light ray be incident at a point P on the reflecting surface 5b. When the angle between the internally reflected incident light ray and a perpendicular to the reflecting surface 5b at the point P is greater than a critical angle $\delta_0$, the internally reflected light ray undergoes total reflection at the point P and is directed again to the opposing reflecting surface 5a. On the other hand, when the angle of incidence of the internally reflected light ray incident at the point P is equal to the critical angle $\delta_0$, it is refracted and emerges parallel to and along the outer surface of the reflecting surface 5b at the point P. Furthermore, when the angle of incidence of the internally reflected light ray is smaller than the critical angle $\delta_0$, it is emitted out of the main body 2 into the surrounding medium at an angle X in relation to the perpendicular as indicated by the broken lines. As described above, the angle of incidence of a light ray striking the reflecting surface is small, the light ray is totally reflected at the reflecting surface and when the angle of incidence is gradually decreased and becomes equal to the critical angle, at least part of the light ray is refracted at the reflecting surface and emitted out of the main body 2 into the surrounding medium in parallel with the outer surface of the reflecting surface. Furthermore, when the angle of incidence is increased, it is refracted at the reflecting surface and emitted out of the main body, 2 into the surrounding medium.

When the material of the main body 2 has an index of refraction n1 and the atmosphere or medium surrounding the main body 2 has an index of refraction n2, the following relation is established.

$$n1 \cdot \sin(\delta_0 - \Delta\delta) = n2 \cdot \sin X$$

Meanwhile, whenever a light ray undergoes total reflection at the reflecting surface 5a or 5b, the angle of incidence of the totally reflected light ray arriving at the opposite reflecting surface 5b or 5a is decreased by $2\alpha$ so that the light ray incident at the reflecting surface becomes more and more upright relative to the reflecting surface, and when the angle of the light ray becomes smaller than the critical angle $\delta_0$, at least part of the light ray is refracted at the reflecting surface and emitted out of the main body to the surrounding medium. It follows therefore that if an internal light ray is incident at the point P at an angle smaller than the critical angle $\delta_0$ by $2\alpha$ and is refracted totally at the reflecting surface and emitted into the surrounding medium as indicated by the broken lines in FIG. 3, the following relation is established:

$$n1 \cdot \sin(\delta_0 - 2\alpha) = n2 \cdot \sin X$$

When the surrounding medium is air, n2=1 and when $\overline{X} = 90° - X$, the following relation is obtained:

$$n1 \cdot \sin(\delta_0 - 2\alpha) = \sin X = \sin(\pi/2 - \overline{X}) = \cos \overline{X}$$

Hence, $$\overline{X} = \cos^{-1}\{n1 \cdot \sin(\delta_0 - 2\alpha)\}$$

Therefore, when $\delta_0 - 2\alpha < \pi/2$, the greater the value $\alpha$, the greater the value $\overline{X}$ becomes.

If the light ray is refracted not totally and emitted out of the main body and the light ray is partly reflected again even when the angle of incidence is smaller than the critical angle, the following relation is obtained:

$$\overline{X} = \cos^{-1}\{n1 \cdot \sin(\delta_0 - 4\alpha)\}$$

As a result, the value $\overline{X}$ is increased more and more.

As is apparent from the above explanation with reference to FIG. 3, the light rays undergo total reflection at the points a, b, c, d and e and the points a1, b1, c1, d1 and e1 as shown in FIG. 1 and when the angles of incidence of the light rays become equal to or smaller than the critical angle $\delta_0$ for the first time at the points f and f1, respectively, the light rays are refracted and emitted out of the main body 2 to the surrounding medium. The light rays are emitted out of the main body 2 also through its end surface 4 to the surrounding medium.

When light rays from all directions are incident on the incidence surface 3 and enter the main body 2 and when it is desired that the light rays emitted from within the main body through the reflecting surfaces 5a and 5b and the end surface 4 are in parallel or almost in parallel with the optical axis O-O, it is preferable that the angle $\alpha$ is made as small as practicable, but when $\alpha$ is made small, the whole length L will be increased (FIG. 2).

In order to overcome this problem, the thickness d of the light incidence surface 3 (FIG. 2) must be reduced as much as possible.

Figure 4:
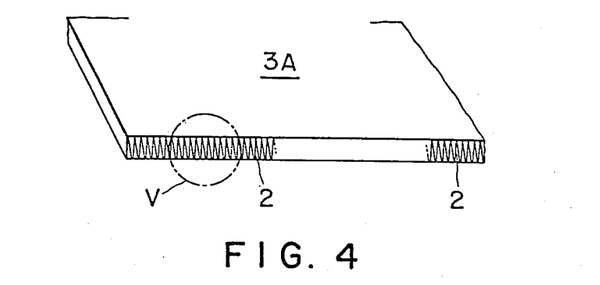
FIG. 4 is a perspective view of an assembly for changing the directions of light rays in which a plurality of main bodies as shown in FIG. 2 are arranged in a parallel array.
Figure 5:
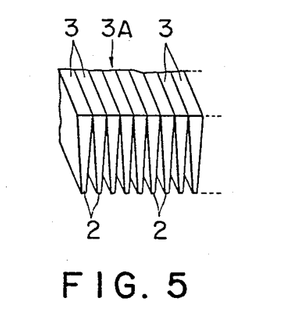
FIG. 5 is an enlarged view illustrating a portion indicated by V in FIG. 4.
Figure 6:
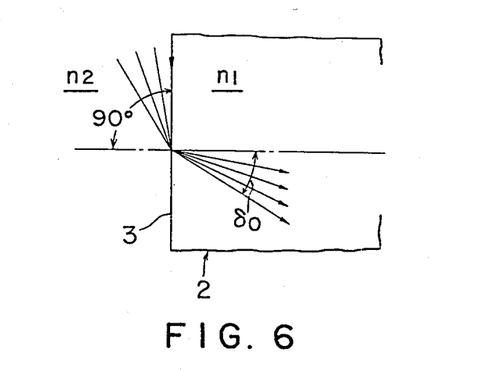
FIG. 6 is a view explanatory of the behaviors of light rays incident on a light incidence surface.

When main bodies 2 having a thickness d made as small as possible are utilized, they are arranged in a parallel array as shown in FIGS. 4 and 5 so that the light incidence surfaces of all the main bodies 2 define a large surface 3A. Then light rays which are incident on the large surface 3A from all directions are changed in directions of propagation within the main body and emitted out of the main body in directions almost perpendicular to the surface 3A.

Next the input of light rays through the light incidence surface 3 into the main body 2 will be considered. It is assumed that the atmosphere or medium surrounding the main body 2 be the air with n2=1 and the main body 2 is made of an acrylic resin with n=1.491. Then, since $$n1 \cdot \sin \delta_0 = n2 \cdot \sin 90°$$

$$1.491 \cdot \sin \delta_0 = 1 \cdot \sin 90°$$

Therefore, $$\delta_0 = \sin^{-1}(\sin 90°/1.491) = 42.12°$$

Therefore, when viewed at a sectional plane, various light rays in air within an angular range of $\delta_0 \times 2 = 84.24°$ can enter the main body 2 and are transmitted therethrough by reflections at the reflecting surfaces 5a and 5b.

Figure 7:
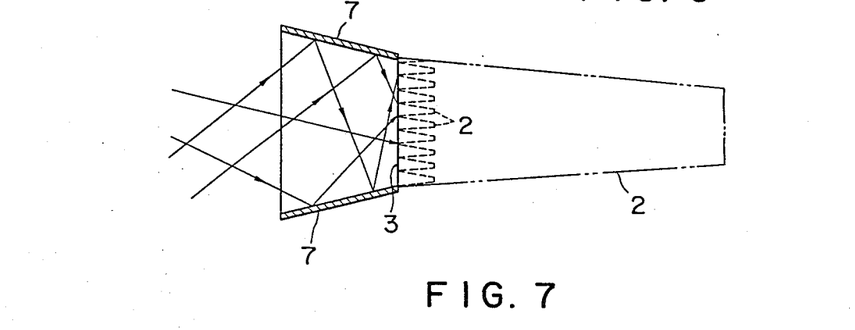
FIG. 7 is a sectional view of a device for assisting the incidence of light rays.

FIG. 7 shows a device for assisting the input of light rays into the main body 2 of the device for changing the directions of light rays. This device serves to reduce the quantity of said material of the main body 2 as much as possible so that the device for changing the directions of light rays can be made light in weight and fabricated economically. The device comprises mirrors 7 extended from the opposite sides of the light incidence surface 3 in such a way that they converge toward the incidence surface 3. Incident light rays from various directions are reflected by the inner surfaces of the mirrors 7 and directed to the incidence surface 3.

As described above, the reflecting surfaces 5a and 5b are converged gradually in the direction away from the light incidence surface 3, but it is to be understood that the reflecting surfaces need not be opposing flat reflecting surfaces.

Figure 8:
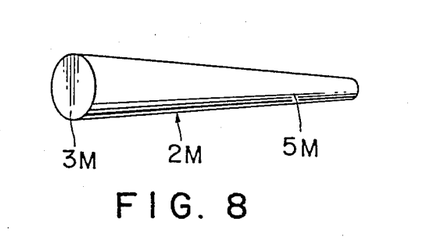
FIG. 8 is a perspective view of a further preferred embodiment of the present invention.

In an embodiment shown in FIG. 8, a circular light incidence surface 3M is merged with a conical reflecting surface 5M so that a main body 2M is in the form of a frustum of cone.

Figure 9:
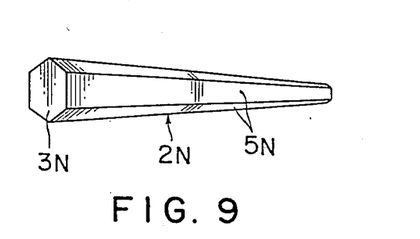
FIG. 9 is a perspective view of a yet further preferred embodiment of the present invention.

In an embodiment as shown in FIG. 9, a main body 2N is in the form of a hexagonal prism and the reflecting surfaces 5N are defined by the inclined surfaces of the hexagonal prism. In addition, any prism having any cross sectional configuration may be used.

In both of the embodiments shown in FIGS. 8 and 9, a light ray enters through the light incidence surfaces 3M and 3N and undergoes repeated total internal reflections in a manner substantially similar to that described hereinbefore with reference to FIG. 1 and is emitted out of the main bodies 2M and 2N. In this case, it should be noted that a light ray propagates along a three-dimensional path.

Figure 10:
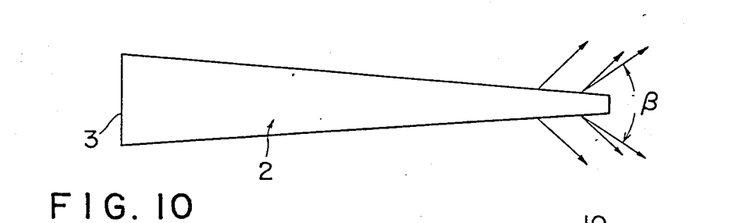
FIG. 10 is a view explanatory of diverging angles of light rays emitted from a main body.

In the above-described embodiments, the light rays which undergo successive total reflections inside the main body 2, 2M or 2N are emitted out of the main body with a diverging angle $\beta$ as shown in FIG. 10 so that the quantity of light rays in parallel with the optical axis is not so great.

Figure 11:
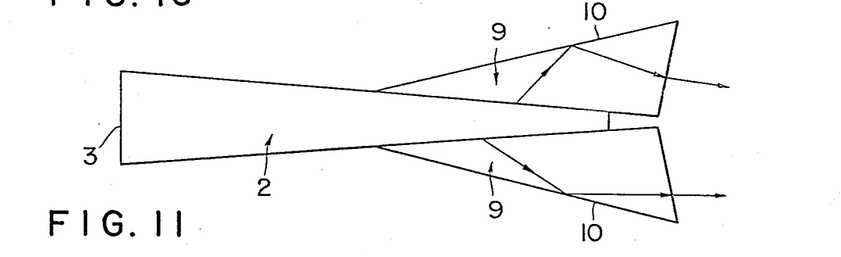
FIG. 11 illustrates auxiliary elements attached to the main body.

In order to overcome this problem, in an embodiment as shown in FIG. 11, optically transparent auxiliary elements 9 each having a triangular cross sectional configuration are attached to the outside surface of a light emitting portion of the main body 2. The light rays which are emitted from the main body 2 with a wide diverging angle pass through thin air layers between the main body 2 and the auxiliary elements 9 and then are reflected or refracted at least once by the reflecting surfaces 10 or the auxiliary elements 9 after the light rays enter the latter whereby the directions of propagation of light rays are changed to those substantially in parallel with the optical axis when emitted from the main body 2. To this end, the reflecting surfaces 10 diverged rearwardly in the direction opposite to that of the light incidence surface 3. The reflecting surfaces 10 may be formed of reflecting films which, for instance, are fabricated by a vacuum deposition process using aluminum. The auxiliary elements 9 are made of solid material. Instead, only mirrors may be provided at the positions of the reflecting surfaces 10. In the case of providing the auxiliary elements 9 for the main body 2 of FIG. 2, the elements are in the form of a plate of triangular cross section, while for the main bodies 2M, 2N of FIGS. 8 and 9, they take the form of an annulus encircling the main body.

Figure 12:
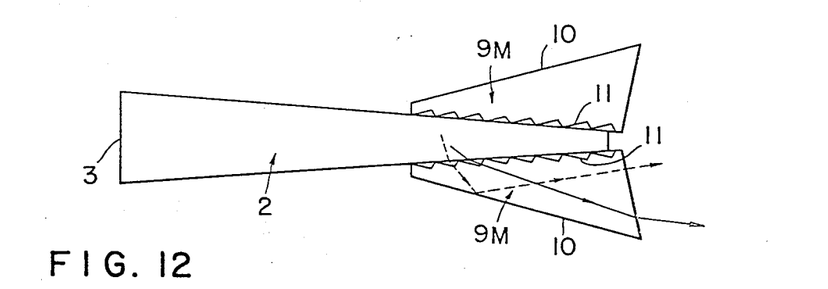
FIG. 12 illustrates modified auxiliary elements.
Figure 13:
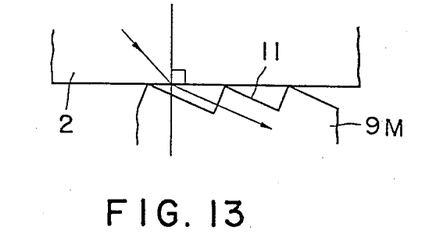
FIG. 13 is a partial view, on an enlarged scale, of FIG. 12.

Auxiliary elements 9M shown in FIG. 12 are different from those shown in FIG. 11 in that the surfaces of the auxiliary elements 9M which are made into contact with the main body 2 are formed with sawtooth portions 11. An air layer is formed between the sawtooth portion 11 and the main body 2, whereby, as shown on an enlarged scale in FIG. 13, the light rays which are emitted out of the main body 2 into the air layer include increased components in parallel with the optical axis. Therefore, in order to fully utilize such components, the sawtooth surfaces of the auxiliary element 9 receive the light rays emitted from the main body 2 substantially at right angles therewith or in the directions almost parallel with the optical axis. When the light rays are emitted out of the auxiliary element 9M, its components parallel with the optical axis are increased.

Figure 14:
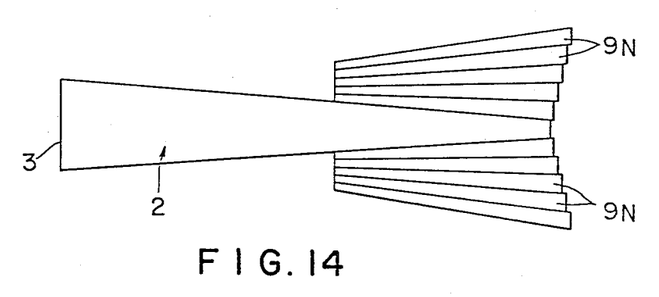
FIG. 14 illustrate yet further auxiliary elements.
Figure 15:
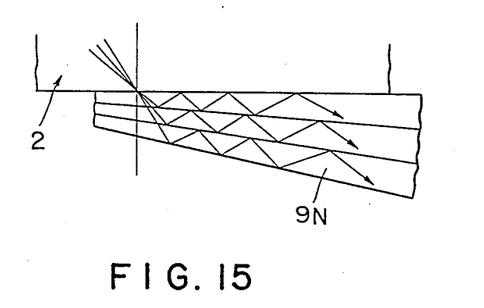
FIG. 15 is a partial view, on an enlarged scale, of FIG. 14.

In an embodiment as shown in FIG. 14, an auxiliary element 9N consists of a lamination of a plurality of relatively thin layers. Each layer of the auxiliary element is gradually increased in thickness in the direction away from the incidence surface 3 whereby, as shown in FIG. 15, components of the light rays which are in parallel with the optical axis are gradually increased as the light is transmitted through the layer by reflections and emitted out of the layer to the surrounding medium.

Unlike the main body as shown in FIG. 2, especially the prism-shaped device for changing the directions of light rays shown in FIGS. 8 or 9 is adapted to receive the light rays from all arbitrary directions around the whole circumference and to change the directions of the light rays thus taken in. A plurality of such main bodies can be also arranged or assembled into an array so that they may be utilized in a mode substantially similar to that described above with reference to FIG. 4.

Figure 16A:
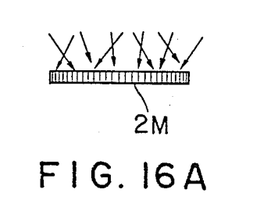
FIG. 16A is a side view of an assembly for changing the directions of light rays in which a plurality of main bodies as shown in FIG. 8 or FIG. 9 are assembled.
Figure 16B:
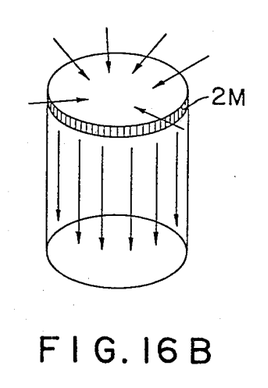
FIG. 16B is a perspective view of FIG. 16A.

Such an embodiment is shown in FIGS. 16A and 16B. A plurality of main bodies 2M (2N) are bundled or assembled in the form of a circular disk as shown in FIG. 16A or in any suitable shape. Innumerable light rays from all directions are rendered substantially parallel with each other as shown in FIG. 16B by this assembly.

Figure 17A:
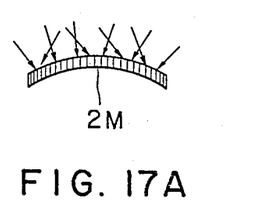
FIG. 17A is a side view of a modification of the assembly shown in FIG. 16A.
Figure 17B:
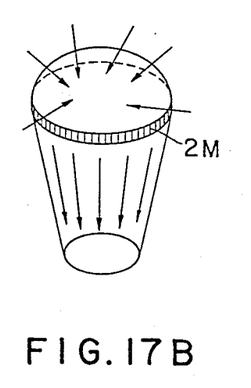
FIG. 17B is a perspective view of FIG. 17A.
Figure 18A:
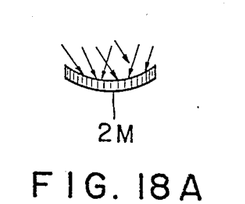
FIG. 18A is a side view of a modification of the assembly shown in FIG. 16A.
Figure 18B:
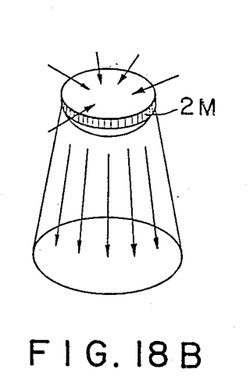
FIG. 18B is a perspective view of FIG. 18A.

In the case of the embodiment shown in FIGS. 16A and 16B, the surfaces of light incidence of the main bodies 2M are arranged in coplanar relationship, but it is also possible that they may be arranged to define a convex surface as shown in FIGS. 17A and 17B or alternatively to define a concave surface as shown in FIGS. 18A and 18B. In the case of the former, the light rays emitted from the main bodies converge while in the case of the latter the light rays emitted from the main bodies diverge. In these cases, the light rays confined in a solid angle in corelation with the concave or convex surface are projected.

Figure 19:
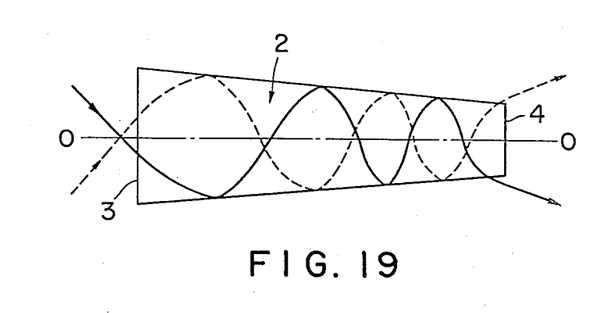
FIG. 19 shows yet another preferred embodiment of the present invention.

In an embodiment shown in FIG. 19, the index of refraction of the main body 2 is gradually or stepwise decreased away from the optical axis O-O toward the outer surface. As a result, the path of a light ray which is repeatedly reflected and transmitted through the main body becomes non-linear.

Figure 20:
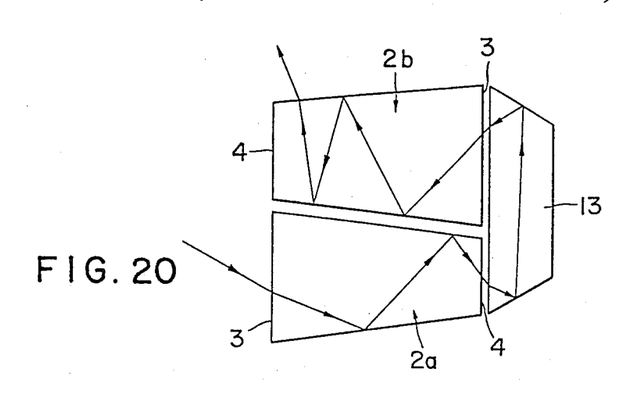
FIG. 20 shows an example of a combination of the main bodies as shown in FIG. 1.

In an embodiment as shown in FIG. 20, two main bodies 2a and 2b are arranged in opposite directions and a transparent connecting element 13 is mounted on the end surface 4 of the first main body 2 and the surface 3 of incidence of the second main body 2b. Therefore, the light rays emitted from the first main body 2a enter the connecting element 13, are reflected in the interior of the same, and then enter the second main body 2b. Thus, in this embodiment, the light rays are reversed in direction when being emitted to outside.

Unlike the embodiments described above, in an embodiment shown in FIG. 21, a main body 2P has a surface of light incidence 3 and reflecting surfaces 5c, 5d and 5e and the surface of incidence 3 also serves as a reflecting surface. The main body 2P has a rectangular cross sectional configuration as a whole and a reflecting plate 14 is embedded in the main body 2P. Therefore, a light ray which enters through the surface of incidence 3 into the main body 2P undergoes "rotating" reflections by the reflecting surfaces 5c, 5d and 5e, the surface of incidence 3 and the reflecting plate 14 and is emitted out of the main body 2P to the surrounding medium when the light ray reaches one of the reflecting surfaces at an angle of incidence smaller than a critical angle $\delta_0$.

Figure 22:
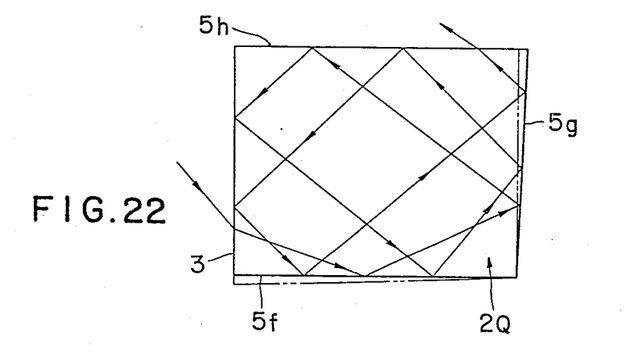
FIG. 22 is a view illustrating another embodiment of a "rotation" type device in accordance with the present invention.

In an embodiment shown in FIG. 22, a main body 2Q has a pair of opposing non-parallel reflecting surfaces 5f and 5h and also a pair of opposing non-parallel reflecting surfaces 3 and 5g. A light ray which enters through the surface 3 of incidence into the main body 2Q, therefore, undergoes rotating reflections successively and is emitted out of the main body 2Q into the surrounding medium when the light ray reaches one of the reflecting surfaces at an angle of incidence smaller than a critical angle $\delta_0$ as shown.

Figure 21:
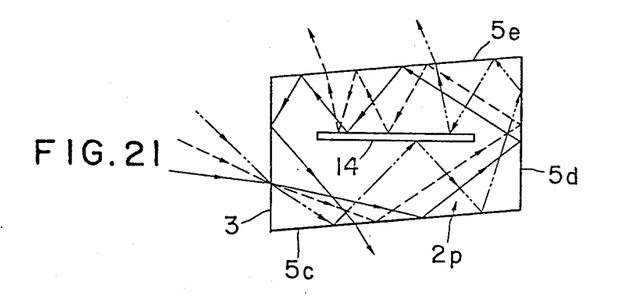
FIG. 21 is a view illustrating an embodiment of a "rotation" type device in accordance with the present invention.
Figure 23:
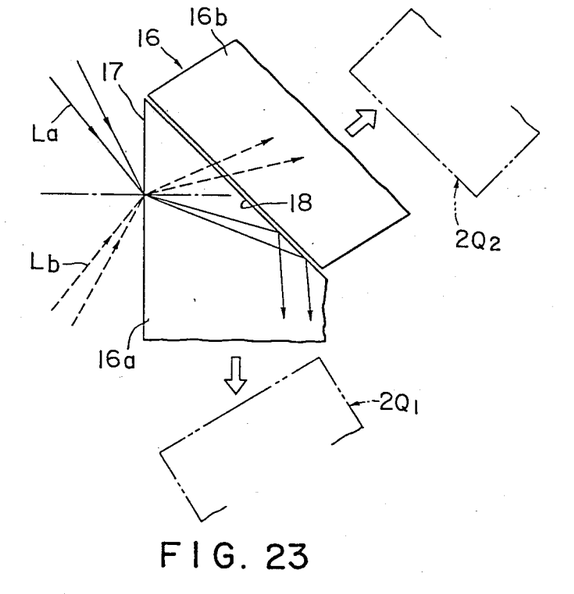
FIG. 23 is a view illustrating a device for selecting the direction of incidence adapted for use with the "rotation" type device in accordance with the present invention.

In the cases of the embodiments shown in FIGS. 21 and 22, the surface 3 of incidence premits a light ray at a predetermined angle of inclination with respect thereto to enter the main body and the reflection of the light ray which has thus entered is reflected in a predetermined direction of "rotation" so that no such effect is attained when a light ray is reflected and rotated in the opposite direction. A device for selecting the angles of incidence as shown in FIG. 23 can be used in conjunction with the above-described main body. The device for selecting the angles of incidence (to be referred to as "a selector" for brevity in this specification) comprises a first transparent element 16a and a second transparent element 16b. A light ray incident at an arbitrary angle of incidence on a surface 17 of incidence of the first element 16a is reflected by an inclined surface 18 as indicated by the solid line and redirected toward the main body 2Q1, but the light rays indicated by the broken lines pass through the inclined surface 18 toward the second main body 2Q2. As described above, the light rays incident on the surface 17 of incidence at various angles of incidence are so selected by the selector as light rays propagating in one direction and the light rays propagating in another direction whereby the main bodies of the embodiments shown in FIGS. 21 and 22 are utilized to change the directions of propagation of light rays from any arbitrary directions.

The total reflection surfaces of the main body can be coated with a reflecting film except at a portion through which the light rays are emitted out of the main body to the surrounding medium.

Figure 24:
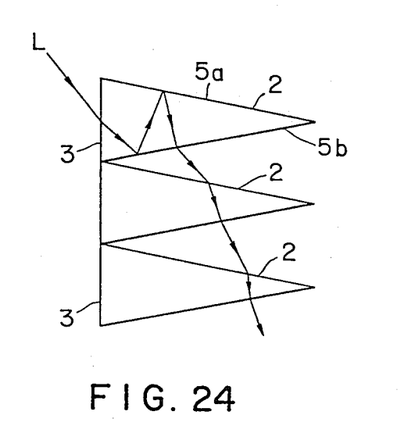
FIG. 24 is a view explanatory of a phenomenon observed when a plurality of main bodies are assembled into a parallel array as shown in FIGS. 4 and 5.

FIG. 24 is a diagrammatic view illustrating on a further enlarged scale a portion of the assembly in which a plurality of main bodies 2 are arranged in a parallel array as shown in FIGS. 4 and 5. As described above, when a light ray enters through the surface 3 of incidence into any one of the main bodies 2, it undergoes repeated total reflections within the main body 2 and then is emitted out of the main body 2 into the surrounding medium. As described above, the incident light ray L is converted into a light ray which is emitted out of the main body and has an increased components parallel to the longitudinal direction of the main body relative to the incident light ray L. When the light rays emitted out of the one main body 2 enters the adjacent main body 2 successively, the components parallel to the longitudinal direction of the main body 2 are gradually decreased as shown in FIG. 24 as it passes through one main body to another. It is therefore quite apparent that such phenomenon is not desirable.

Figure 25:
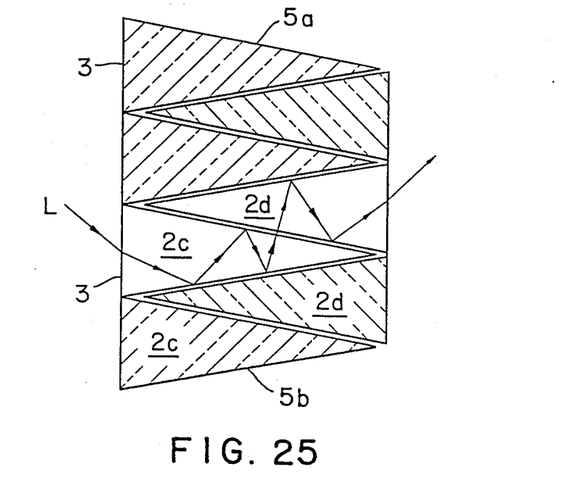
FIG. 25 is a sectional view, on an enlarged scale, of a still further embodiment of a device for changing the directions of light rays in accordance with the present invention.

In order to prevent such undesired phenomenon, the assembly as shown in FIG. 25 can be used. According to this assembly, a plurality of main bodies 2d which are arranged in a parallel array and directed in one direction are inserted into the spaces defined between the adjacent main bodies 2c which are arranged in a parallel array and directed in the other or opposite direction in complementary relationship. In this assembly, a light ray L, which is incident on the surface 3 of incidence of one main body 2c and enters the same, undergoes repeated total reflections within the main body 2c, is emitted out from the main body 2c and immediately enters an adjacent main body 2d which is oriented in the one direction. After undergoing repeated total reflections within the main body 2d, the light is emitted out of the main body 3d into the surrounding medium through the bottom surface of the main body 2d. Thus, the phenomenon described before with reference to FIG. 24 can be avoided.

Figure 26:
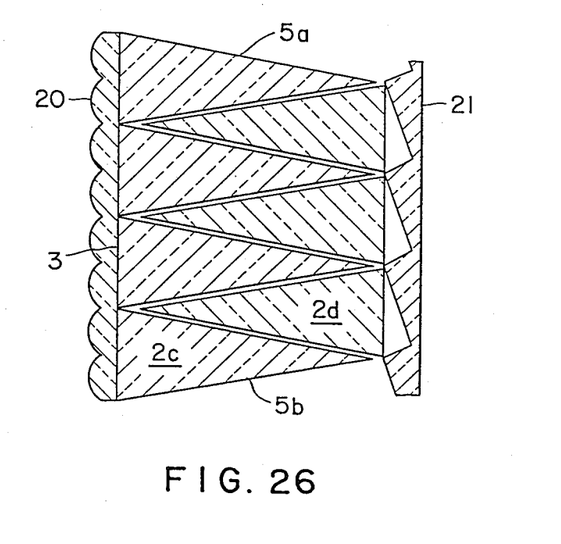
FIG. 26 is a sectional view, on an enlarged scale, of a yet further embodiment of the present invention.

In the case of the assembly of the main bodies 2c and 2d as shown in FIG. 25, a suitable light control element can be attached to at least one surface of the assembly. In the case of an embodiment illustrating such attachment of optical control elements, as shown in FIG. 26, a lenticular lens 20 is attached to the surfaces 3 of incidence of the main bodies 2c. Further, a Fresnel lens 21 is attached to the bottom surfaces of the main bodies 2d. It is possible to exchange the positions of such lenticular lens and Fresnel lens or to eliminate a lenticular lens or Fresnel lens. Furthermore, it is possible to superimpose a plurality of such light control elements one upon another. Moreover, other light control elements can be used. When such light control elements are provided, further controls of light rays in response to optical characteristics of these light control elements can be made.

As described above, when the device for changing the directions of light rays in accordance with the present invention is utilized, light rays from different directions and within a certain angular range, incident on a stationary surface of incidence, can be caught and can subject them to repeated internal reflections therewithin, to convert the light rays into light rays which are substantially in parallel with a desired direction. Furthermore, even when the direction of incident light varies, it is not needed to trail the incident light. Moreover, the three-dimensional main body used in this invention can be fabricated from a simple optically transparent material. Therefore, the device, in accordance with the present invention is inexpensive and is free from breakdowns. In addition, in the device in accordance with the present invention, a plurality of main bodies can be assembled into various shapes to obtain further useful effects. When the devices in accordance with the present invention are superimposed one upon another or bundled, further complex and useful effects can be obtained.

INDUSTRIAL APPLICABILITY

According to the present invention, it becomes possible to receive scattered light, diffused light, light emitted from various portions of a light source having some size, light whose direction varies and so on to redirect it in a predetermined direction or project it with a desired shape. Therefore, the present invention can be used for utilization of the solar energy, illumination control, transmission of images and patterns and so on.

I claim:

1. A method of converting rays having various directions into light rays within a limited range of directions comprising the steps of:

providing a transparent optical body in the form of a wedge-shaped plate having opposite non-parallel major surfaces constituting reflecting surfaces, and a light incidence surface interconnecting one end of said reflecting surfaces, said reflecting surfaces converging gradually in a direction away from said light incidence surface;

causing light rays having various directions to enter said optical body through said light incidence surface;

causing the light rays, which have entered said optical body, to be internally and successively reflected by said reflecting surfaces until said successively internally reflected light rays are caused to have angles incident on the reflecting surfaces, which angles are equal to or smaller than a critical angle with respect to said reflecting surfaces; and causing the light rays, whose angles incident on the reflecting surfaces have become an angle equal to or smaller than said critical angle, to emerge from within the optical body to the outside through a light emerging surface portion of the optical body remote from said light incidence surface, in such a manner that the light rays emerging will be within a limited range of directions; and causing the light rays emerging from said light emerging surface portion to pass through transparent auxiliary elements of substantially triangular cross section, disposed outside of and adjacent to said light emerging surface portion, so as to make smaller the range of directions of the light rays which have passed through the auxiliary elements.

2. A method as set forth in claim 1, further comprising the step of directing light rays having various directions to said light incidence surface by means of a mirror disposed adjacent to the light incidence surface.

3. A method as set forth in claim 1, further comprising the step of causing the light rays emerging from the light emerging surface to pass through air gaps formed between the light emerging surface and the auxiliary elements before the light rays are passed through the auxiliary elements.

* * * * *